UNITED STATES PATENT OFFICE.

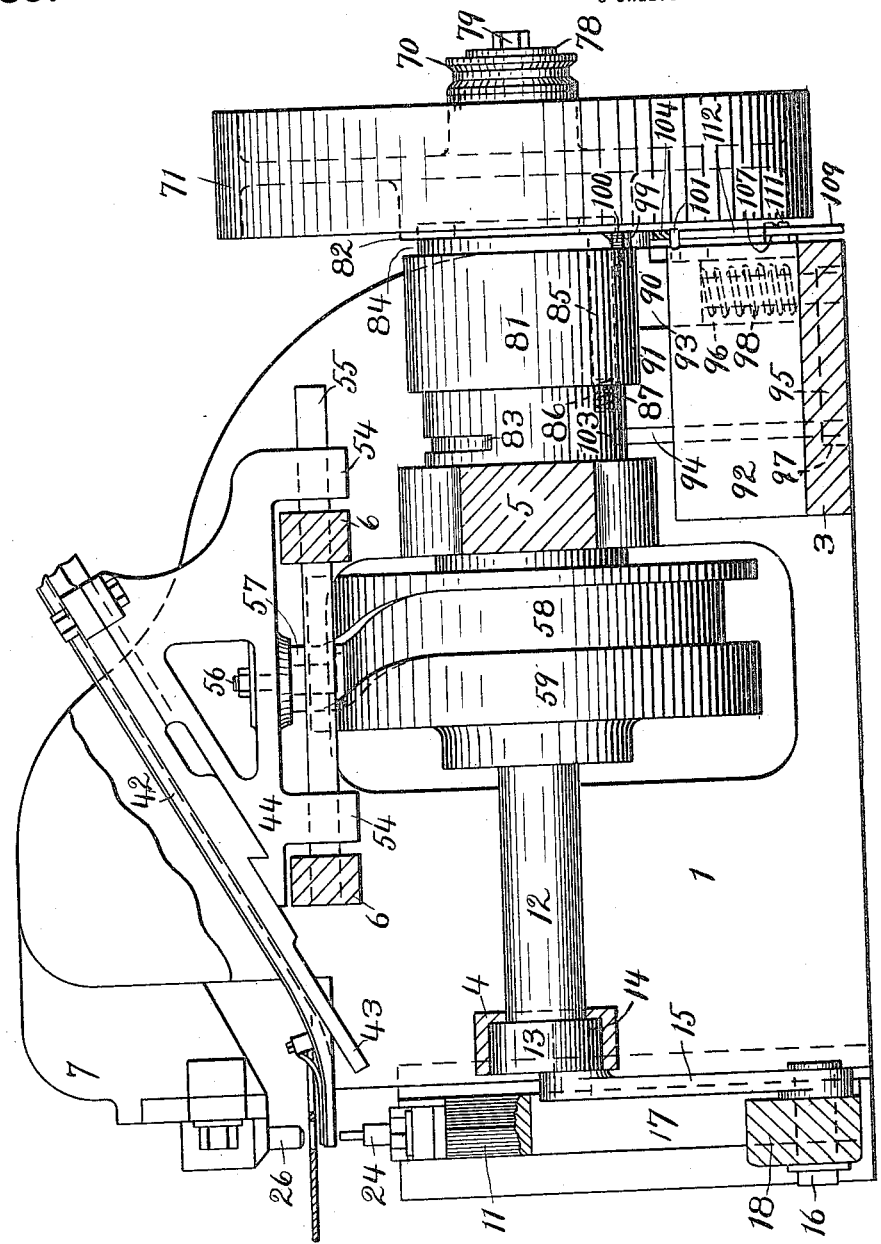

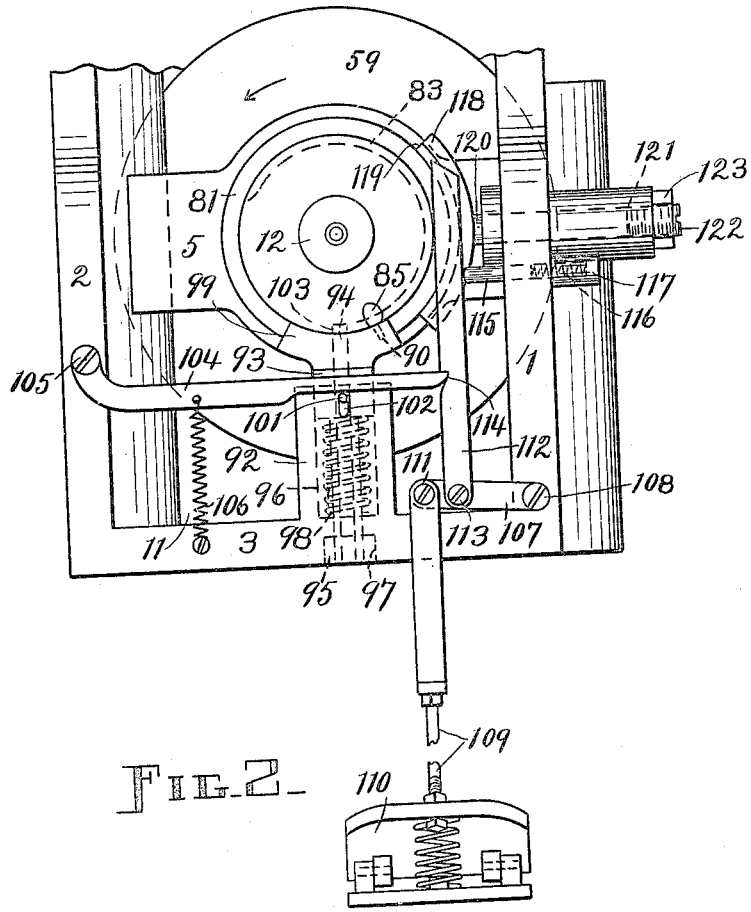

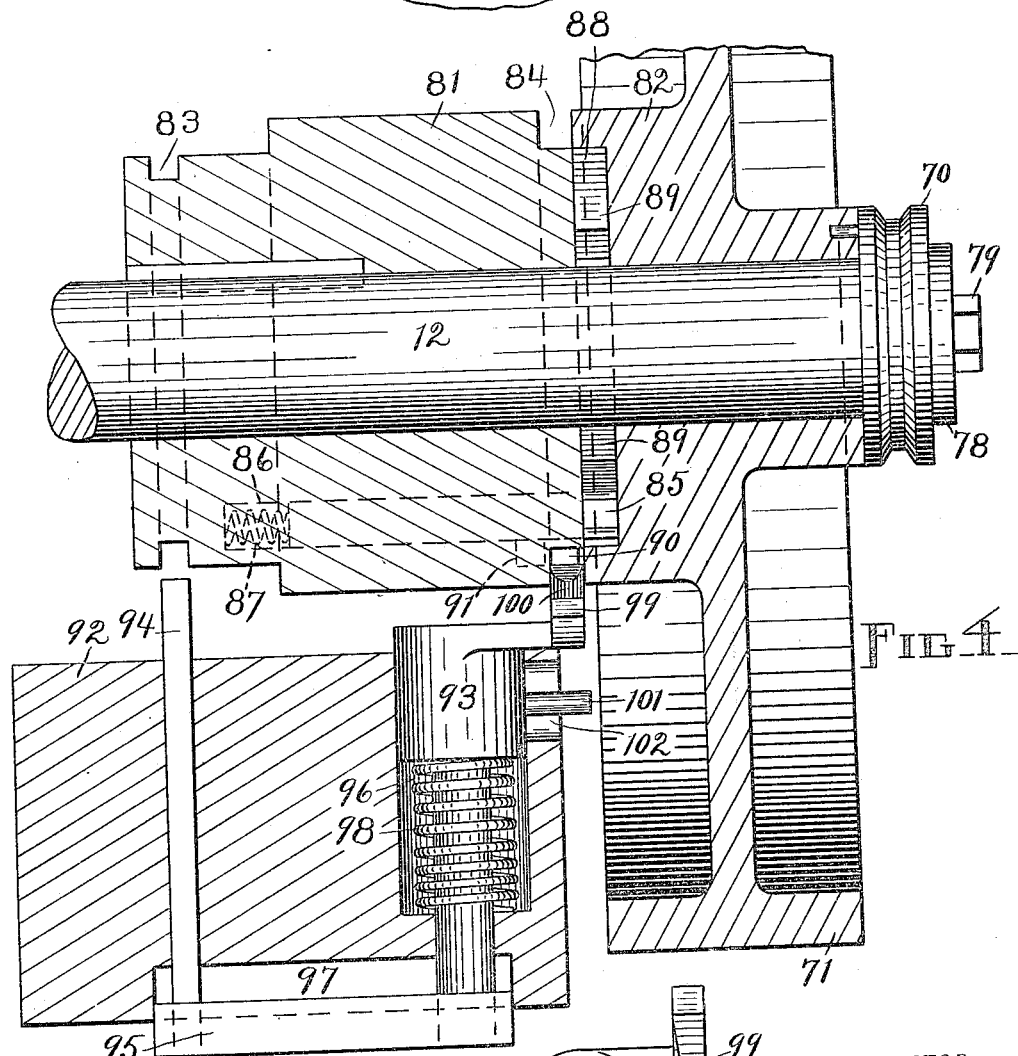

JOHN J. DOIDGE, OF SOUTH FRAMINGHAM, MASSACHUSETTS, ASSIGNOR, BY MESNE ASSIGNMENTS, TO THE R. H. LONG MACHINERY COMPANY, OF SOUTH FRAMINGHAM, MASSACHUSETTS, A CORPORATION OF CONNECTICUT.

CLUTCH MECHANISM.

1,140,885.  Specification of Letters Patent.  Patented May 25, 1915.

Original application filed July 9, 1909, Serial No. 506,751. Divided and this application filed August 24, 1910. Serial No. 578,767.

*To all whom it may concern:*

Be it known that I, JOHN J. DOIDGE, a subject of the King of Great Britain, residing at South Framingham, in the county of Middlesex and State of Massachusetts, have invented certain new and useful Improvements in Clutch Mechanism, of which the following is a specification, the same being a divisional part of the application filed by me in the United States Patent Office on the 9th day of July, 1909, Serial No. 506,751.

My invention relates to improvements in mechanism of the clutch type, especially designed for use in eyeleting machines, although not confined to such use, and which comprises in a general way a combination of coöperating elements capable of rotatably connecting a revoluble member with a revolving member, and of disconnecting such members, the mechanism being subject to a treadle for example for the starting impulse, and adapted to operate automatically to disconnect said members at the end of a revolution or cycle, all as hereinafter set forth.

The object of my invention is to provide clutch mechanism which, though comparatively simple in construction, is positive and accurate in operation, and especially well adapted for eyeleting and other machines wherein it is necessary to have a clutch that can be easily and quickly operated to start the machine or certain parts of the same, and which require that the clutch shall act to stop such machine or parts instantly at the completion of a cycle.

Other objects will appear in the course of the following description.

I attain these objects by the mechanism illustrated in the accompanying drawings, in which—

Figure 1 is a side elevation of a practical form of my invention, showing the same applied to parts of an eyeleting machine, some portions of which parts are broken away, leaving other portions in section, so as to afford a clear view of the clutch mechanism; Fig. 2, a rear elevation of said mechanism, without the driving pulleys shown in the preceding view; Fig. 3, an enlarged detail of a portion of the large driving pulley, viewed from the inside; Fig. 4, an enlarged elevation with associated parts in section of certain members of said clutch mechanism, and, Fig. 5, an enlarged top plan of one of the clutch mechanism devices.

Similar figures refer to similar parts throughout the several views.

The supporting frame or casing herein shown for the clutch mechanism, and which constitutes the frame or casing for the eyeleting machine with which said mechanism is incorporated in the present case, comprises side pieces 1 and 2, a base or floor piece 3 connecting such side pieces at the back, cross pieces 4 and 5 extending between said side pieces, two lugs 6 projecting inward from each of the side pieces, and a top connection between the side pieces from which a hood 7 projects forward at the front end of the casing. Other parts of the eyeleting machine are briefly described as follows: A vertically-movable slide 11 having V-shaped ends is arranged to be reciprocated in V-shaped grooves in the sides 1 and 2. A main driving shaft 12 is journaled in the cross pieces 4 and 5. This shaft has an enlargement 13 at its front end to which is pivoted at 14, eccentric to the axis of said shaft with its enlargement, the upper terminal of a connecting-rod 15. The lower terminal of the connecting-rod 15 is pivoted at 16 to the slide 11. Thus the slide 11 is reciprocated by the shaft 12 through the medium of the connecting-rod 15, and with the parts standing as in Fig. 1 each revolution of said shaft causes said slide to be reciprocated once for a complete operation of the sets carried thereby. The slide 11 is cut out in the center, as shown at 17, and built out in front, as shown at 18, to accommodate the connecting-rod 15 and furnish a bearing for the pivot 16. The lower sets, this being a gang eyeleting machine, are carried by the slide 11, one of such sets appearing at 24, and the upper, fixed sets are supported from the hood 7, one of such fixed sets appearing at 26. A gang raceway 42, to coöperate with the movable sets, is fastened on a bed-plate 43 mounted on a horizontally-reciprocating carriage 44. The carriage 44 has bottom lugs 54 each pair of which on a side are mounted to slide on a rod 55 secured in the corresponding pair of lugs 6. Mounted on a stud 56, depending from the center of the carriage 55, is an anti-friction roller 57 which enters a cam-groove 58 in a cam 59 tight on the main shaft 12 in front of the cross piece 5. The shape of the cam-groove 58 is such that, as the cam 59 revolves, the carriage 44 is reciprocated through the medium of the roller 57. The movements of the carriage 44 for the raceway 42 and the slides 11 for the lower sets 24 are timed so as to bring about the usual results. Loosely mounted on the shaft 12 at the rear end is a driving pulley 71, which is held against backward displacement by a small pulley 70, a washer 78 and a screw 79, the latter being tapped into said rear end of said shaft. The pulley 71 is belted to a main or countershaft (not shown) and revolves during the entire time that the machine is in use.

I will now proceed to describe in detail the mechanism by means of which the movable sets and the raceway are caused and enabled to make one and only one full stroke up and down and back and forth, respectively, at a time. With this mechanism, which though of the nature of a clutch is unlike the usual form of clutch and posseses elements which are not, strictly speaking, clutch elements, the eyelet-handling parts of the machine are automatically stopped at the end of every cycle of operation, and the full and complete control of the machine is thus given into the hands of the operator. Taking up this clutch mechanism and the parts directly associated therewith, it will be observed that I mount a collar 81 fast on the shaft 12 between the cross piece 5 and the hub 82 of the pulley 71, and that this collar has a cam-groove 83 in a portion of its periphery near the front end, and a reduced part at the rear end which forms with the adjacent end of said hub an annular groove 84, and is provided with a bolt 85. The bolt 85 is arranged to slide in a passage 86 in the collar 81 parallel with the shaft 12, and said bolt is actuated or pressed rearwardly by a spring 87 in said passage between the closed front end of the passage and the inner end of the bolt. The back end of the passage 86 opens through the corresponding end of the collar 81 into an annular chamber 88 in the hub 82. When the bolt 85 is thrust backward to its fullest extent by the spring 87, the head of said bolt enters the chamber 88 as far as the inner face thereof will permit and lies in the path of travel of a radial lug 89 in said chamber—see Figs. 3 and 4. There may be a plurality of lugs 89, four having been provided in this instance. The timing of the parts hereinafter described is such that the bolt does not encounter the front side of any one of the lugs 89, but if it did the lug so encountered would quickly pass away from the bolt and allow the head of the bolt to enter the chamber 88. On the bolt 86 a short distance from the back end thereof is a lug 90, and this lug 90 slides in and out of a radial recess 91 in the collar 81. The recess 91 opens into the groove 84, so that when the lug 90 is not in said recess it is in said groove.

Directly below the axial center of the collar 81 and integral with the base piece 3 is a vertical holder 92 for a plunger 93 and a lock pin 94 which rise perpendicularly from a connecting bar 95. The plunger 93, the pin 94 and the bar 95 operate in suitable passages in the holder 92, the plunger passage being designated by the number 96 and the bar passage or recess by the number 97. The aforesaid plunger, pin and bar are rigidly connected, so that they all move together and pressure applied to or removed from one affects correspondingly the others, and they constitute a combination throwout and stop for the collar 81 and the shaft 12. A spring 98, in the passage 96, encircles the stem of the plunger 93 between the head of said plunger and said passage, and said spring presses the combination throw-out and stop upwardly. The head of the plunger 93 has an arm or projection which extends back over the top of the holder 92 and then upward to terminate in a segmental cam 99 adapted to enter the groove 84 and present its cam surface 100 (Fig. 5) to the lug 90. A horizontal pin 101 projects from the back side of the plunger head, through a slot 102 in the holder 92 beyond the back side of said holder. The pin 94 is in line with the cam-groove 83 in the collar 81 above. The cam-groove 83 does not extend all the way around the collar 81, and the deep end of said groove constitutes a stop 103, Figs. 1 and 2, which is adapted to contact with the upper end of the pin 94 when said pin is in said groove and said collar is rotated.

An operating trip-lever 104, for the plunger 93 and connected parts, has one end pivoted at 105 to the back edge of the side 2, extends part way across the open rear end of the frame or casing of the machine, and is held down on the protruding end of the pin 101 by a spring 106. The spring 106 has its ends fastened to the trip lever 104 and the rear edge of the base piece 3, respectively. This spring is much weaker than the spring 98, so that the former exerts no appreciable influence on the combination throw-out and stop. A short horizontal arm 107 has one end pivoted at 108 to the back edge of the side 1, and extends across from such pivotal point beneath the free end of the trip-lever 104. The upper end of a connecting-rod 109, between the arm 107 and an operating or starting treadle 110, is pivoted at 111 to the end of said arm opposite the pivot 108, and the base of a vertical trip 112 for the trip-lever 104 is pivoted at 113 to said arm between the other two pivotal points. The trip has a notch 114 therein to operatively receive the adjacent end of the trip-lever, and said trip is pressed into engagement or contact with said lever by means of a horizontal plunger pin 115 acted on by a spring 116 in the usual manner, said pin and spring being suitably pocketed or mounted in the side 1 and an outwardly projecting part 117 thereof. The treadle 110 is of the ordinary hinged and upwardly-spring-pressed variety.

In order to steady the action of the driving parts of the mechanism and assist in stopping them and in preventing undue jar and shock when they do stop, I provide a suitable brake. The brake here represented consists of a shoe 118 having a leather or other facing 119, and a shank 120, Fig. 2, said shoe or its facing being arranged and adapted to bear against the periphery of the collar 81 in front of the groove 84. The shank 120 is received into a horizontal passage 121 which extends through the side 1 and suitable projections on both sides thereof. A screw 122 is in threaded engagement with the walls of the passage 121 at its outer end, and the degree of pressure of the brake on the collar 81 is determined by said screw, since the latter bears on the outer end of the shank 120, so that by turning the screw inwardly such pressure is increased and by turning the screw outwardly such pressure is decreased. A check-nut 123 may be employed on the protruding terminal of the screw 122, for the usual purpose.

I will next explain the operation of the starting and stopping mechanism described above, including the combination throw-out and stop and the brake.

Assuming that the clutch mechanism is disposed as shown in Figs. 1 and 2, the operator depresses the treadle 110 with his foot and releases it. When the back end of the treadle is depressed it draws down the connecting-rod 109 and with said rod the trip 112 through the medium of the arm 107. The trip 112 in turn carries down the trip-lever 104 by reason of the engagement between these members at 114, said lever swinging on its pivot 105. Then upon the release of the treadle 110 the intervening members return the trip and the trip-lever to their former positions. The spring-pressed pin 115 keeps the trip in engagement with the trip-lever during the downward and upward movement of the parts, and at all times for that matter. When the trip-lever 104 is actuated downward it depresses the plunger 93 against the resiliency of the spring 98, through the medium of the pin 101, and so causes the cam 99 to be withdrawn from behind the bolt lug 90 and the pin 94 from the cam-groove 83 ahead of the stop 103 in the direction of rotation of the collar 81, the combination throw-out and stop now being in the position shown in Fig. 4. Instantly the bolt 85 is actuated rearwardly by its spring 87 and the head of said bolt enters the chamber 88 and is engaged by one of the lugs 89 carried by the revolving pulley 71. The collar 81 with the shaft 12 immediately commences to revolve because of the interlocking engagement between the pulley 71 and said collar afforded by the bolt 85 and its contacting lug 89, and the bolt lug 90 is carried away from the vicinity of the cam 99. The release of the trip-lever 104 frees the combination throw-out and stop so that the pin 94 rises into contact with the unbroken portion of the periphery of the collar 81. The shaft, while making the revolution which it has just commenced, brings about the elevation of the slide 11 and the retraction of the raceway 42, and the descent of said slide and the advance of said raceway, through the medium of the connecting-rod 15, cam 59, and other parts. This work having been accomplished and the shaft 12 having made one complete revolution, said shaft must be stopped. It will now be remembered that the pin 94 was left riding on the unbroken periphery of the collar 81, the spring 98 being the active agent responsible for this, but quickly as said collar continues to rotate said pin enters the cam-groove 83, and when it enters the deep part of such groove it permits such an elevation of the members to take place that the cam 99 is located well up in the groove 84 and fully in the path of the bolt lug 90. Upon further rotation of the collar 81, the lug 90 rides against the narrow part of the cam 99, and begins to be thrust forward by said cam as the width of the cam increases until, just before riding clear of the cam, said lug is moved far enough into the recess 91 to withdraw the bolt 90 from all contact with the formerly engaging lug 89. At this instant the stop 103 strikes the pin 94 and the collar 81 and shaft 12 with the parts driven or operated thereby cease further movement or motion. The cam 99 is left behind the bolt lug to hold the bolt in its inactive position until next the machine is started, and the pin 94 is left in the cam-groove 89 with the stop 103 against it. Thus it will be seen that every time the treadle is manipulated the working parts of the machine perform one cycle of operation, the mechanism being left at the end of each cycle in readiness for the next.

The cam 99 not only is responsible for the withdrawal of the bolt 85 at the proper time, but insures that such withdrawal shall be gradual and without shock; and the brake provides against any serious jar or shock when the stop 103 strikes the pin 94, by retarding the collar 81 as soon as the latter is released from the pulley 71. The brake should not be set up tight enough against the collar to appreciably interfere with the rotation thereof when revolubly connected with the driving pulley.

It will be noted that the upper terminal of the trip 112 extends into the groove 84 and is therefore in the path of the bolt projection or lug 90 when the latter is free from the cam 99 and in said groove, consequently if the operator does not release the treadle 110 soon enough or before said lug reaches said trip, after being released by said cam, said lug actuates said trip against the force of the spring-pressed pin 115 to a sufficient extent to disengage the notched part 114 from the end of the trip-lever 104. Said trip-lever thus freed no longer prevents or interferes with the upward movement of the combination throw-out and stop under the influence of the spring 98. Upon the release of the treadle the trip rises and its notched part 114 slips into engagement once more with the contiguous end of the trip-lever. It is thus seen that the spring-pressed pin 115 not only serves to keep the trip in engagement with the trip-lever, as previously noted, but that it also serves to retain said trip in the path of the bolt lug, and the notched part 114 in position to be reengaged by said lever in the event that disengagement takes place in the manner and for the reason just explained. Without some provision of this kind it might frequently happen that the throw-out and stop would not act quickly enough, could not in fact, to prevent a second cycle of the machine, so that one of the primary objects of the mechanism would be defeated. Under normal conditions or when the operator acts with sufficient celerity in releasing the treadle to allow the trip and trip-lever to rise before the lug 90 reaches said trip, said lug simply idly oscillates the trip as it passes the same.

Some considerable departure from the construction herein shown and described may be made, as is obvious, without violating the spirit of my invention, or exceeding the scope of my claim.

What I claim as my invention, and desire to secure by Letters Patent, is—

The combination, in clutch mechanism, with a suitably journaled shaft, and a driving pulley loose on such shaft and provided with one or more bolt-engaging lugs, of a collar fast on said shaft adjacent to such pulley, a bolt carried by said collar and provided with a projecting part, yielding means to actuate such bolt into the path of said bolt-engaging lug or lugs, a spring-pressed retracting and releasing cam member capable of being projected into the path of said projecting part of the bolt, a trip-lever arranged and adapted to actuate said cam member out of said path, and a trip for said trip-lever, said trip extending into the path of said bolt projection.

JOHN J. DOIDGE.

Witnesses:
 EUGENE A. CLARK,
 GEORGE G. WHITTEMORE.

Copies of this patent may be obtained for five cents each, by addressing the "Commissioner of Patents, Washington, D. C."